United States Patent
Khanyile-Lynch

(10) Patent No.: US 12,017,429 B2
(45) Date of Patent: Jun. 25, 2024

(54) MOBILE PALM OIL PROCESSING MACHINE

(71) Applicant: Celi Lindiwe Khanyile-Lynch, Cambridge, MA (US)

(72) Inventor: Celi Lindiwe Khanyile-Lynch, Cambridge, MA (US)

( * ) Notice: Subject to any disclaimer, the term of this patent is extended or adjusted under 35 U.S.C. 154(b) by 315 days.

(21) Appl. No.: 17/702,514

(22) Filed: Mar. 23, 2022

(65) Prior Publication Data
US 2023/0302752 A1 Sep. 28, 2023

(51) Int. Cl.
*B30B 9/02* (2006.01)
*B30B 9/12* (2006.01)
*B62K 27/00* (2006.01)
*B62K 27/12* (2006.01)

(52) U.S. Cl.
CPC ............. *B30B 9/02* (2013.01); *B30B 9/12* (2013.01); *B62K 27/003* (2013.01); *B62K 27/12* (2013.01)

(58) Field of Classification Search
CPC .... B30B 9/02; B30B 9/08; B30B 9/12; B30B 9/14; B30B 9/16; B62K 27/003; B62K 27/12
USPC .......................................... 100/100, 117, 120
See application file for complete search history.

(56) References Cited

U.S. PATENT DOCUMENTS

| | | | |
|---|---|---|---|
| 3,003,412 A * | 10/1961 | Vincent | ..................... B30B 9/12 100/148 |
| 7,121,575 B2 | 10/2006 | Finch | |
| 8,382,142 B2 | 2/2013 | Edmondson | |
| 9,132,766 B2 | 9/2015 | Scarbrough et al. | |
| 10,023,261 B2 | 7/2018 | Kilcrease | |
| 10,207,209 B1 * | 2/2019 | Toft | ........................ B30B 9/262 |
| 10,300,970 B2 | 5/2019 | Beiler | |
| 2006/0182579 A1 | 8/2006 | Maxwell | |
| 2020/0031078 A1 * | 1/2020 | Wecker | ..................... B30B 9/12 |

FOREIGN PATENT DOCUMENTS

| | | | | |
|---|---|---|---|---|
| CN | 109159448 A | * | 1/2019 | |
| CN | 110126334 A | * | 8/2019 | |
| FR | 2808766 A1 | * | 11/2001 | ........... B62K 27/006 |

OTHER PUBLICATIONS

Celi Khanyile-Lynch, Powering Small Holder Palm Oil Proudcers, Green Source, Powered by Squarespace, https://www.greensourceafrica.com/.

* cited by examiner

*Primary Examiner* — Jimmy T Nguyen

(57) ABSTRACT

A mobile palm oil processing machine that is capable of being towed by a light-duty vehicle such as a motorcycle and that includes a small-scale palm oil press mounted on a trailer along with a diesel engine that is coupled to the palm oil press via a drive shaft. The trailer further comprises includes a removable cover capable of being deployed as a shelter roof or alternatively as a ramp when the mobile palm oil processing machine is deployed on site. The trailer further includes the capability for self-propulsion that allows the trailer to ascend and descend steep inclines and to assist the light-duty vehicle in self extrication when the trailer is stuck, such as on a muddy or unimproved road.

12 Claims, 9 Drawing Sheets

MOBILE PALM OIL PROCESSING MACHINE

TECHNICAL FIELD

This disclosure relates generally to a mobile palm oil processing machine, and, more particularly, to a mobile palm oil processing machine that is adapted for being towed by a light duty vehicle such as a motorcycle.

BACKGROUND

Palm oil is an edible vegetable oil derived from the mesocarp (reddish pulp) of the fruit of the oil palms. Palm oil is used in food manufacturing, in beauty products, and as biofuel. The palm oil press is used to extract crude palm oil fruit, a practice that is typically done in many nations including Cameroon where such extraction is a major part of the agriculture of the region. Resources for extraction are limited to those with the financial resources to procure processing machinery. This is further complicated by the fact that a palm oil press is most often deployed in a fixed location and is not easily transportable. Palm oil harvest season typically spans January through May of each year and palm oil presses are fully utilized during that time.

Palm oil is ideally extracted on site, typically at the farm, for maximum efficiency and reduced cost of transport. Therefore, there is a need for a palm oil press that is more readily transported to the farm site. Such transport is often difficult because the typical farm can only be accessed via unimproved roads that are often inaccessible by conventional automobiles and trucks. The motorcycle is better adapted for such roads, is commonly available, and is less expensive to purchase and operate than larger vehicles, and therefore preferable to tow a mobile palm oil processing machine.

Hence, there is a need for a mobile palm oil processing machine that is adapted for being towed by a light duty vehicle such as a motorcycle and that is capable of navigating unimproved roads and rough terrain. Once the mobile palm oil processing machine is deployed on site, the mobile palm oil processing machine may be further adapted to provide efficient production of palm oil with a removable cover. To address these issues, a mobile palm oil processing machine is provided that includes a trailer adapted for transporting a palm oil press and an engine.

SUMMARY

In one general aspect, the instant application describes a mobile palm oil processing machine that is capable of being towed by a light duty vehicle such as a motorcycle. A small-scale palm oil press is mounted on a trailer along with a small diesel engine. In one illustrative embodiment, a 10 horsepower Caroll Stream CS186 diesel engine may be used. The engine and palm oil press are coupled via a drive shaft. The engine may be capable of being at least partially fueled by palm oil as a biofuel.

In another general aspect, the trailer further includes a removable cover capable of being deployed as a shelter roof over the mobile palm oil processing machine when it is deployed on site for processing palm oil.

In another general aspect, the trailer further includes a removable cover capable of being deployed as a ramp to provide easier access to the mobile palm oil processing machine when it is deployed on site for processing palm oil.

In another general aspect, the trailer further includes capability for self-propulsion that couples the engine to a set of rear wheels via a transmission that is coupled to the drive shaft that allows the trailer to ascend and descend steep inclines and to assist the light-duty vehicle in self extrication when the trailer is stuck, such as on a muddy or unimproved road.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, and components have been described at a relatively high-level, without detail, in order to avoid unnecessarily obscuring aspects of the present teachings.

Figure 1:
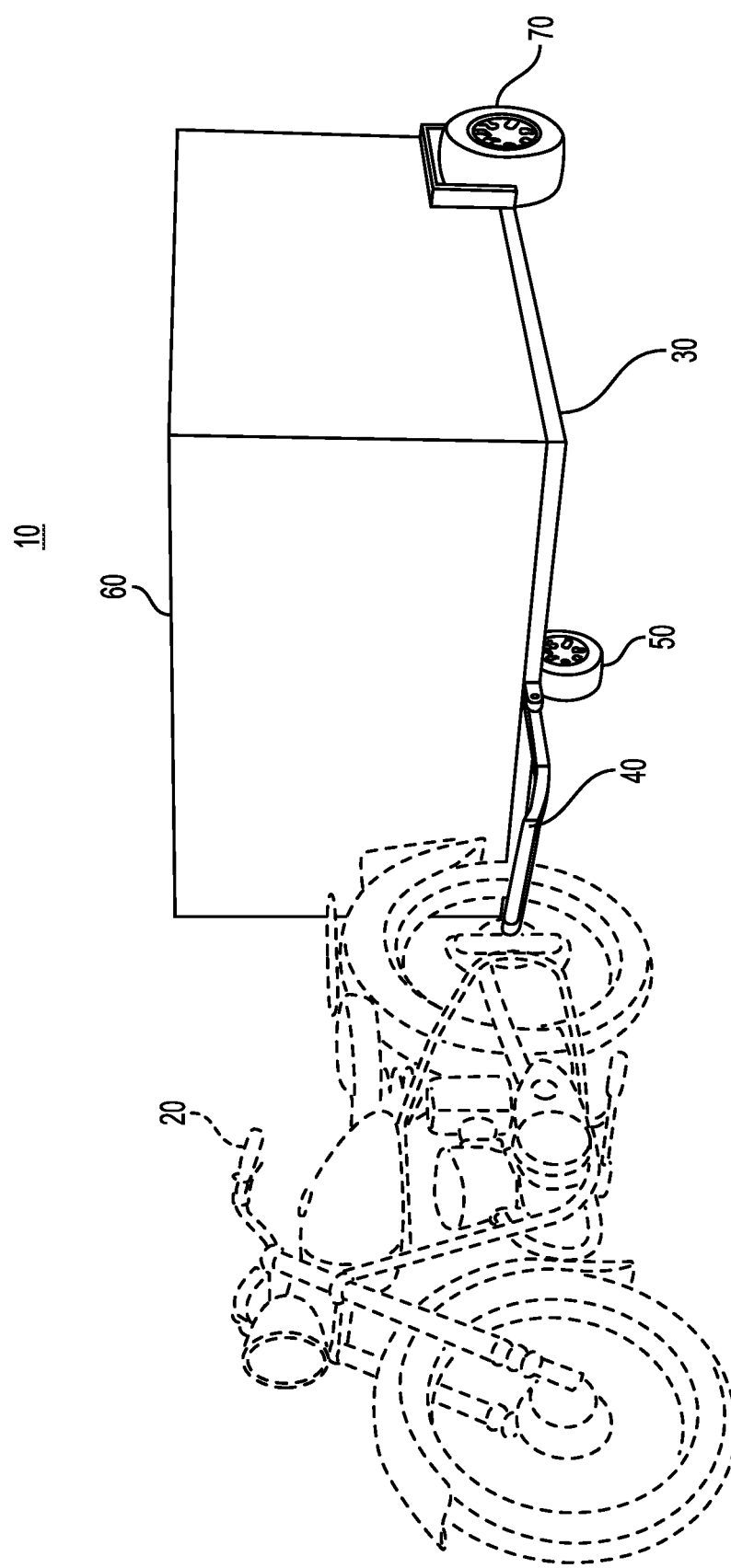
FIG. 1 is a side elevational view of the mobile palm oil processing machine configured for transport.

FIG. 1 illustrates a side elevational view of a mobile palm oil processing machine 10 that may be coupled to a light-duty vehicle 20 that may be in the form of a motorcycle. The mobile palm oil processing machine 10 comprises a trailer 30 that includes a towing arm 40, a front wheel 50 that is rotatably attached to the trailer 30, a removable cover 60 that is attached to the top portion of the trailer 30, and a rear wheel 70 that is attached to the rear portion of the trailer 30.

Figure 2:
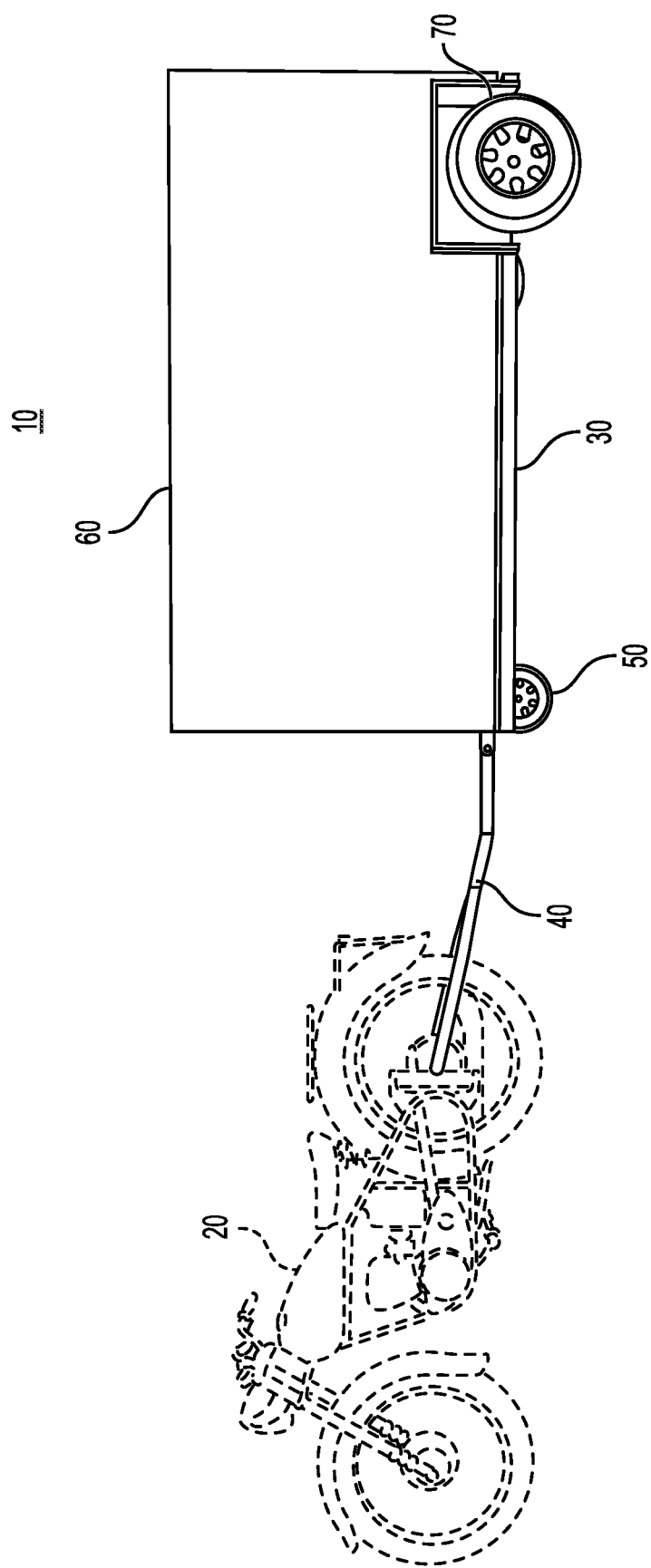
FIG. 2 is a side perspective view of the mobile palm oil processing machine configured for transport.

FIG. 2 illustrates a side perspective view of the mobile palm oil processing machine 10 that is coupled to the light-duty vehicle 20 for towing via the towing arm 40. The light duty vehicle 20 may be any of a variety of inexpensive vehicles that could include motorcycles, and 3-wheeler and 4-wheeler all terrain vehicles (ATVs) and the like. The mobile palm oil processing machine 10 comprises the trailer 30 that includes the towing arm 40, the front wheel 50 that is rotatably attached to the trailer 30, the removable cover 60 that is attached to the top portion of the trailer 30, and the rear wheel 70 that is attached to the rear portion of the trailer 30.

Figure 3:
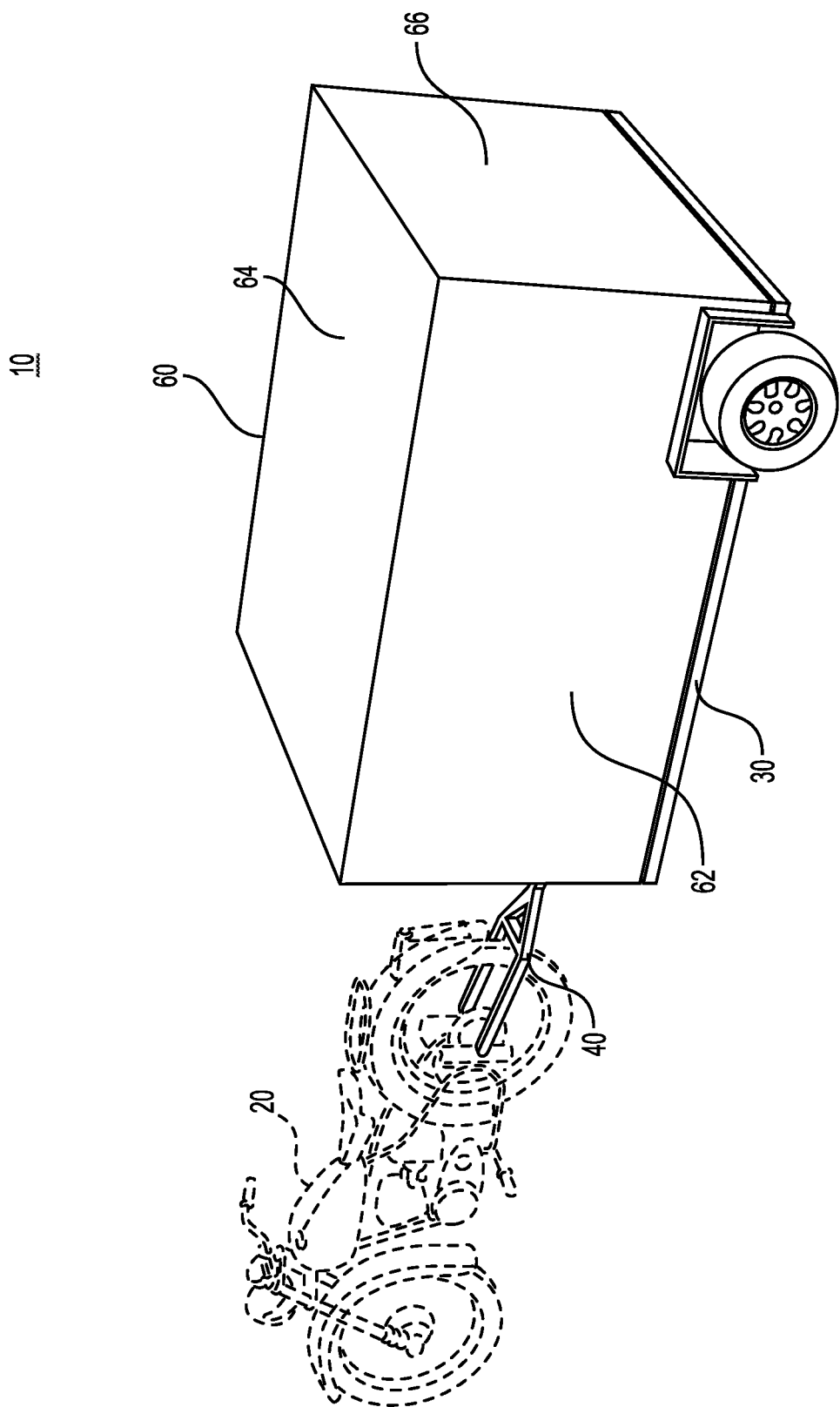
FIG. 3 is another side elevational view of the mobile palm oil processing machine configured for transport.

FIG. 3 illustrates a side elevational view of the mobile palm oil processing machine 10 that is coupled to the light duty vehicle 20 via the towing arm 40. The removable cover 60 further comprises a left cover 62, a top cover 64, and a rear cover 66. When the mobile palm oil processing machine 10 is being transported such as being towed by the light-duty vehicle 20, the removable cover 60 is closed to enclose the trailer 30.

Figure 4:
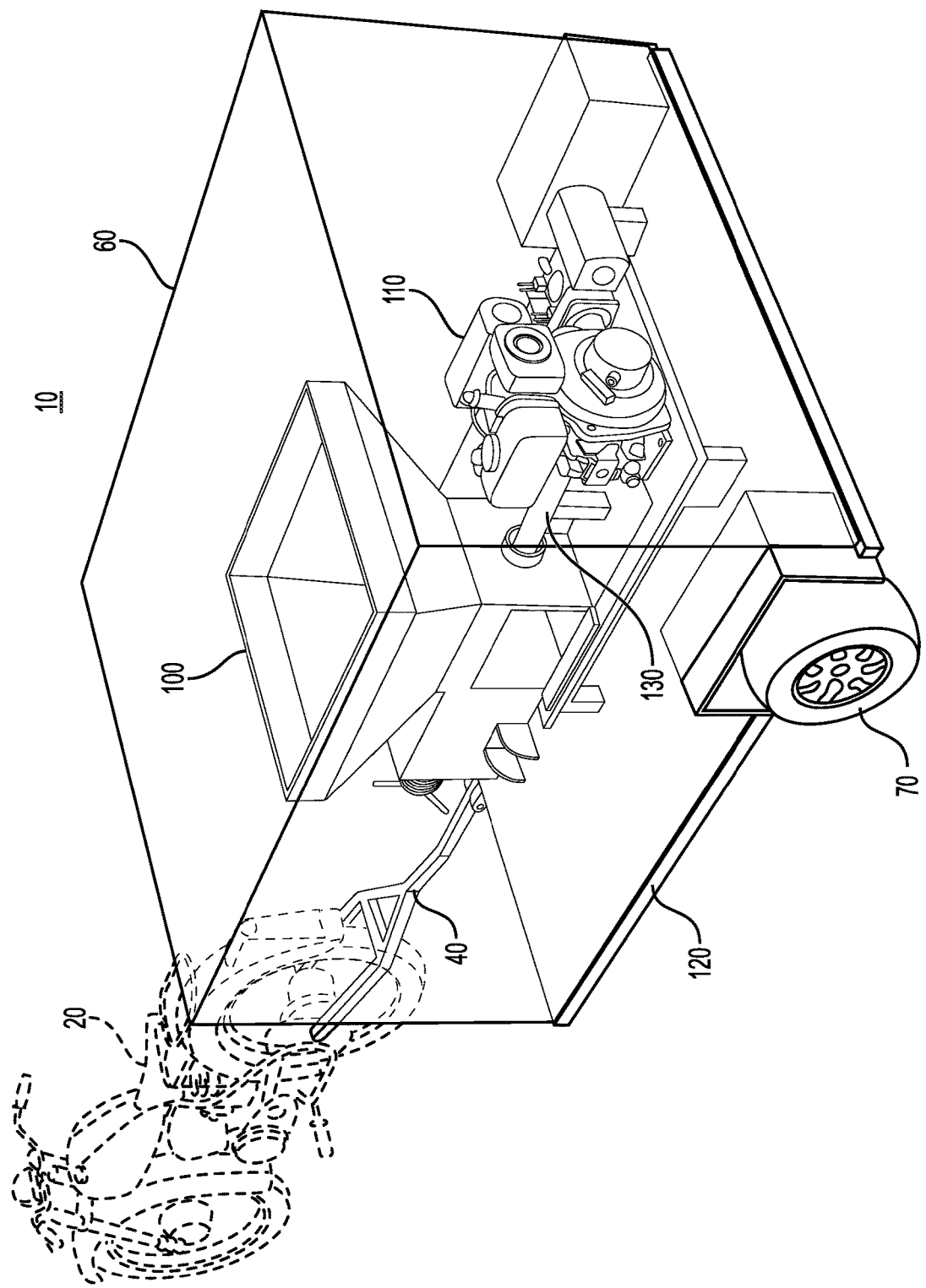
FIG. 4 is a side elevational view of the interior of the mobile palm oil processing machine.

FIG. 4 illustrates a side elevational view of the mobile palm oil processing machine 10 that is coupled to the light duty vehicle 20 via the towing arm 40. The removable cover 60 is shown in transparent view to illustrate the interior of the trailer 30. A palm oil press 100 is coupled to a top surface of the deck structure 120. The engine 110 is coupled to the palm oil press 100 via a drive shaft 130. The engine 110 may be directly coupled to the deck structure 120 or alternatively coupled to the palm oil press 100 as part of its structure. The palm oil press 100 and the engine 110 are preferably mounted over the rear wheels 70 in a way that distributes the combined weight of the trailer 30, the palm oil press 100, and the engine 110 to facilitate towing by the light-duty vehicle 20. The palm oil press 100 may be sourced from commonly available industry machinery for palm oil presses and adapted for mounting on the deck structure 120.

The engine 110 is preferably a diesel engine such as the Caroll Stream model CS186 10 horsepower that may be capable of being at least partially fueled by palm oil as a biofuel. Other types of similar internal combustion engines of similar size and horsepower may be readily substituted.

Figure 5:
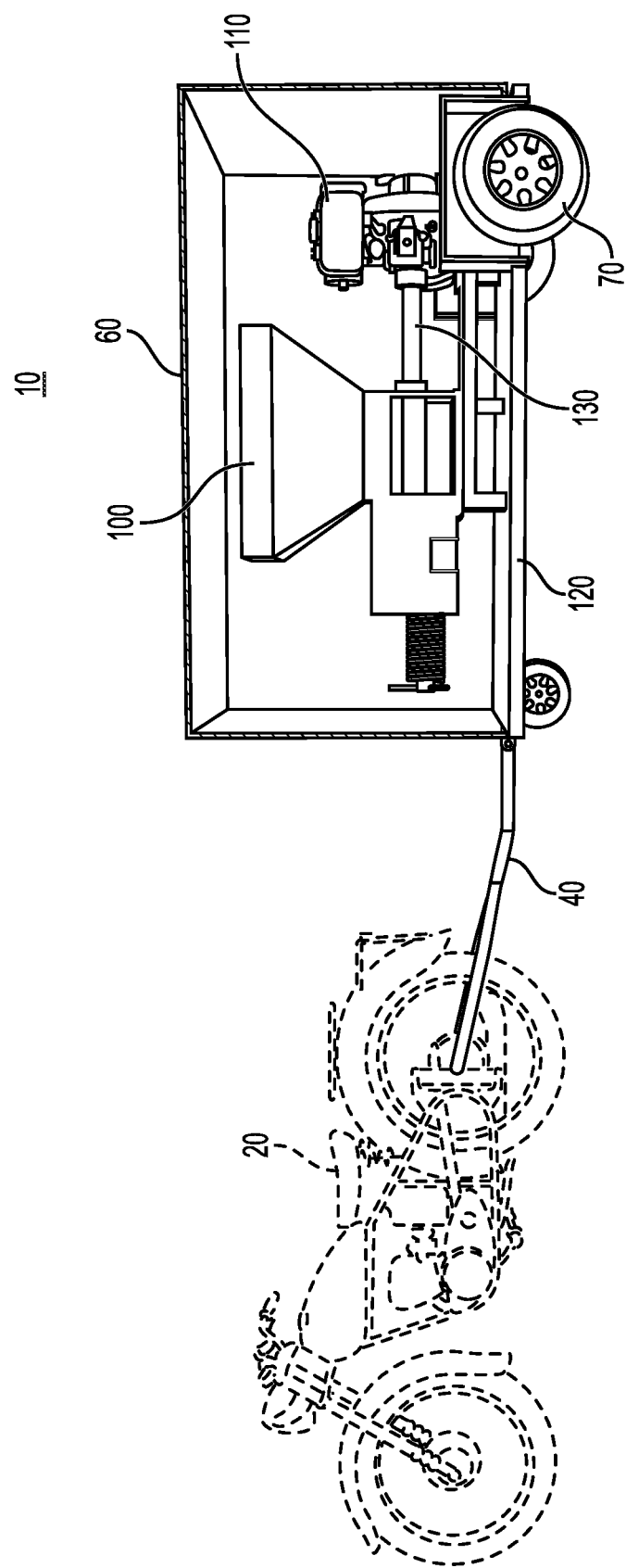
FIG. 5 is a side perspective view of the interior of the mobile palm oil processing machine.

FIG. 5 illustrates a perspective view of the mobile palm oil processing machine 10 that is coupled to the light-duty vehicle 20 via the towing arm 40. The removable cover 60 is shown in transparent view to illustrate the interior of the mobile palm oil processing machine 10. A palm oil press 100 is coupled to a top surface of the deck structure 120. The engine 110 is coupled to the palm oil press 100 via a drive shaft 130. The engine 110 may be directly coupled to the deck structure 120 or alternatively coupled to the palm oil press 100 as part of its structure. The palm oil press 100 and the engine 110 are preferably mounted over the rear wheels 70 in a way that distributes the combined weight of the trailer 30, the palm oil press 100, and the engine 110 to facilitate towing by the light-duty vehicle 20. The palm oil press 100 may be sourced from commonly available industry machined and adapted for mounting on the deck structure 120.

Figure 6:
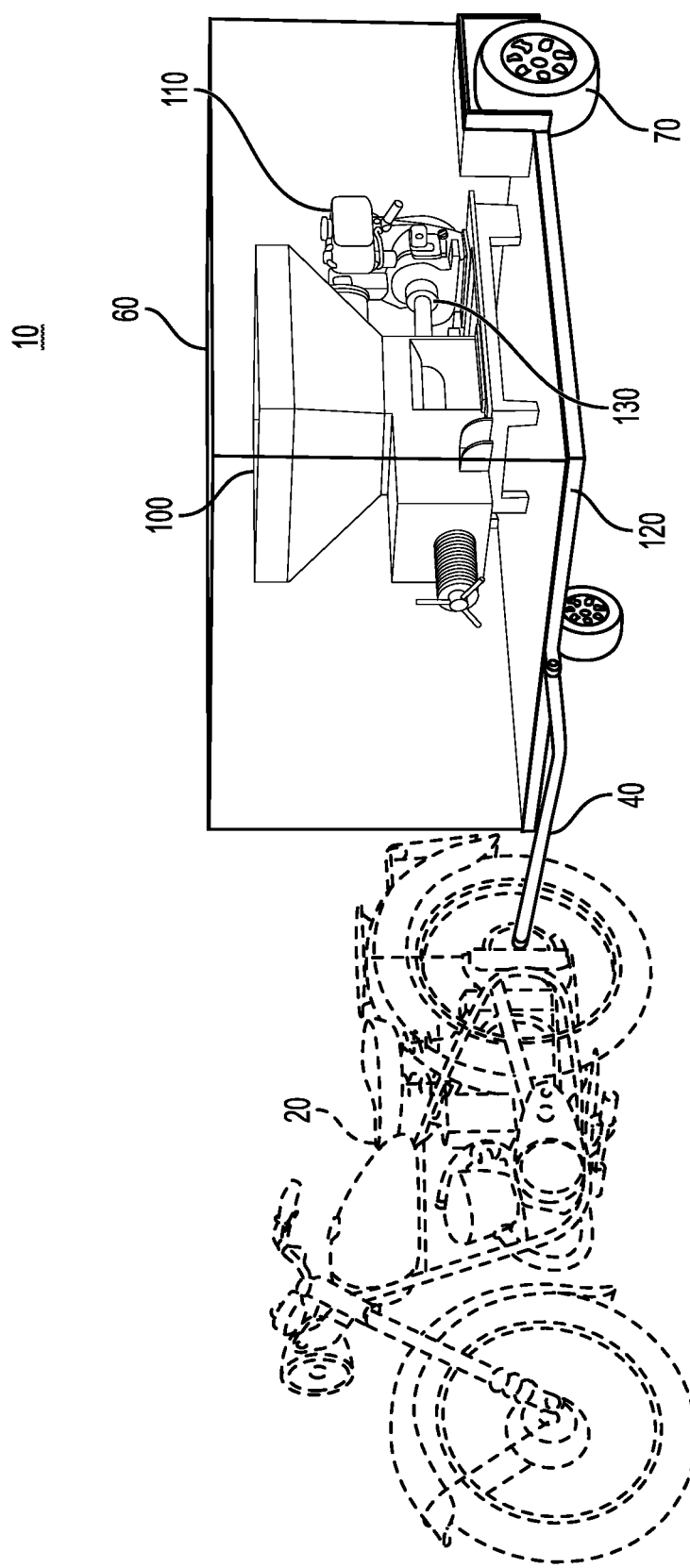
FIG. 6 is another side elevational view of the interior of the mobile palm oil processing machine.

FIG. 6 illustrates a side elevational view of the mobile palm oil processing machine 10 that is coupled to the light-duty vehicle 20 via the towing arm 40. The removable cover 60 is shown in transparent view to illustrate the interior of the mobile palm oil processing machine 10. A palm oil press 100 is coupled to a top surface of the deck structure 120. The engine 110 is coupled to the palm oil press 100 via a drive shaft 130. The engine 110 may be directly coupled to the deck structure 120 or alternatively coupled to the palm oil press 100 as part of its structure. The palm oil press 100 and the engine 110 are preferably mounted over the rear wheels 70 in a way that distributes the weight of the mobile palm oil processing machine 10 to facilitate towing by the light-duty vehicle 20. The front wheel 50 supports the weight on the forward portion of the trailer 30. The palm oil press 100 may be sourced from among commonly available palm oil press machines and adapted for mounting on the deck structure 120.

Figure 7:
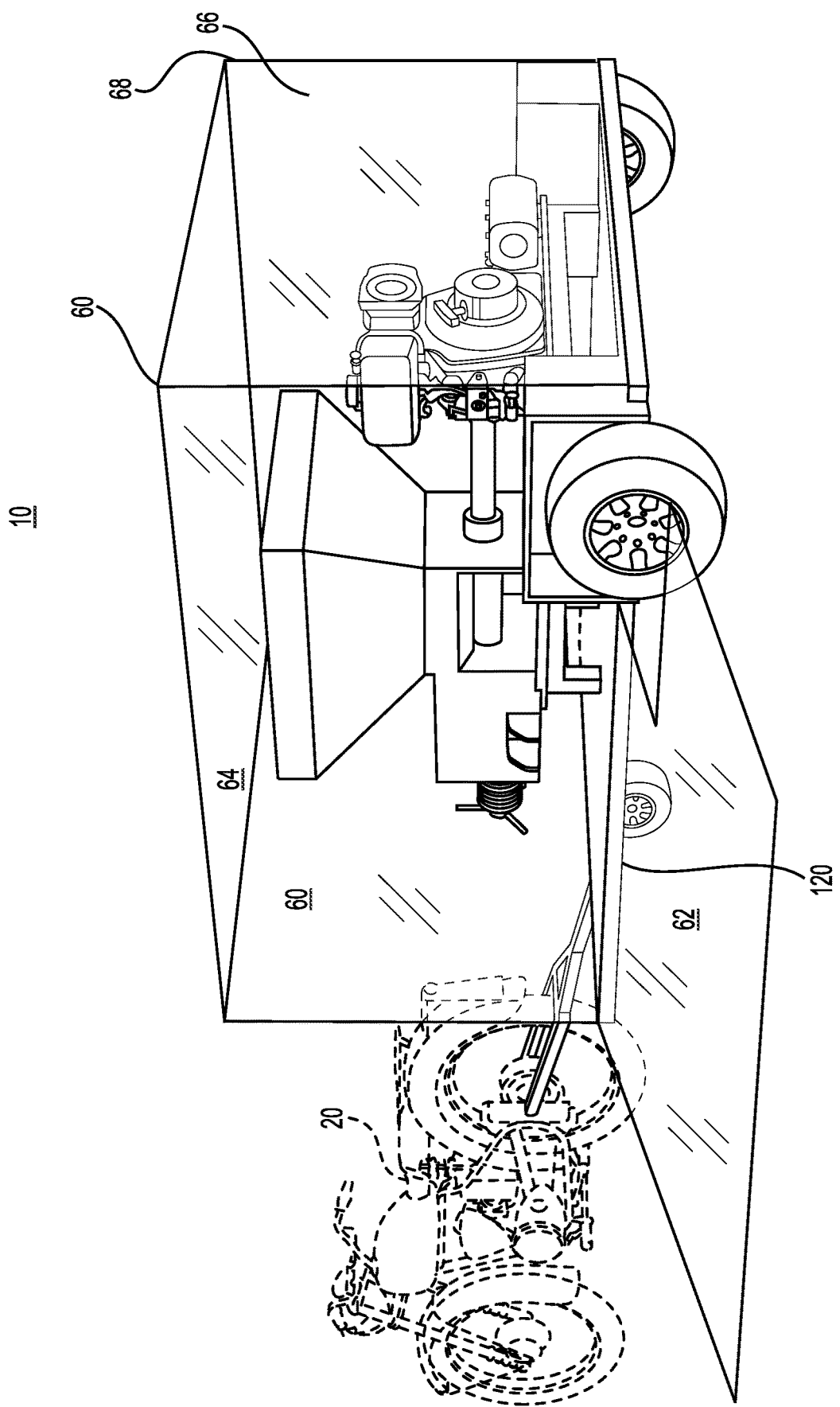
FIG. 7 is another side elevational view of the mobile palm oil processing machine showing a removable top cover with a left side panel lowered to form a ramp.

FIG. 7 illustrates a side elevational view of the mobile palm oil processing machine 10. The removable cover 60 further comprises the left cover 62, the top cover 64, the rear cover 66 and a right cover 68. When the mobile palm oil processing machine 10 is being transported such as being towed by the light-duty vehicle 20, the removable cover 60 is closed to enclose mobile palm oil processing machine 10. As shown, the left cover 62 is shown in a folded down position and is hingeably coupled to the deck structure 120 to allow the rotation between the closed and folded down positions. The rear cover 66 and the right top cover 68 may also be hingeably coupled to the deck structure 120 in the same manner to provide a folded down position.

Figure 8:
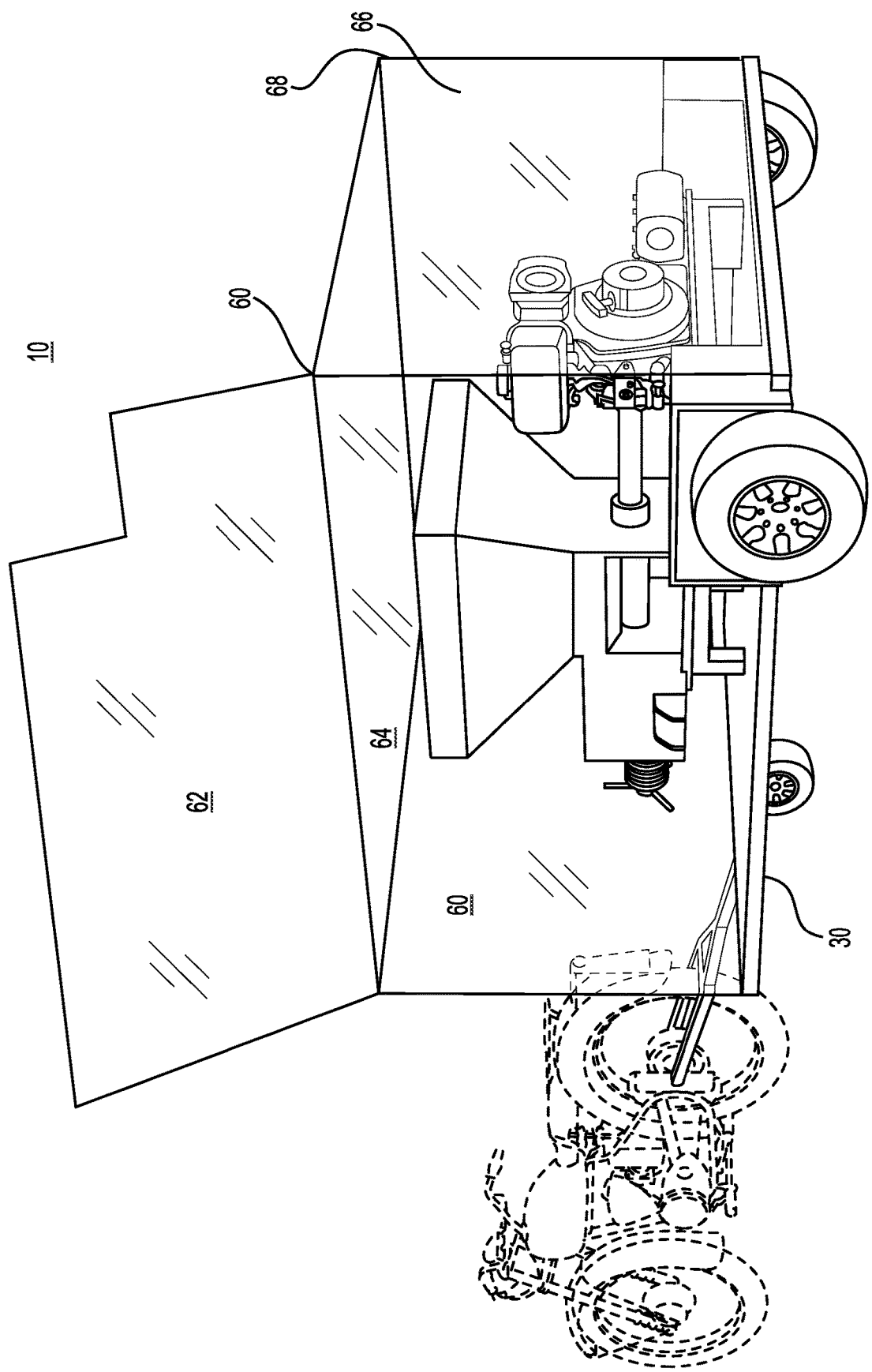
FIG. 8 is another side elevational view of the mobile palm oil processing machine showing a removable top cover with a left side panel raised to form a shelter roof.

FIG. 8 illustrates a side elevational view of the mobile palm oil processing machine 10. The removable cover 60 further comprises the left cover 62, the top cover 64, the rear cover 66 and the right cover 68. When the mobile palm oil processing machine 10 is being transported such as being towed by the light-duty vehicle 20, the removable cover 60 is closed to enclose the mobile palm oil processing machine 10. As shown, the left cover 62 is shown in a raised position and is hingeably coupled to the top cover 64 to allow the rotation between the closed and raised positions. The rear cover 66, and the right cover 68 may also be hingeably coupled to the top cover 64 in the same manner to provide a raised position.

Figure 9:
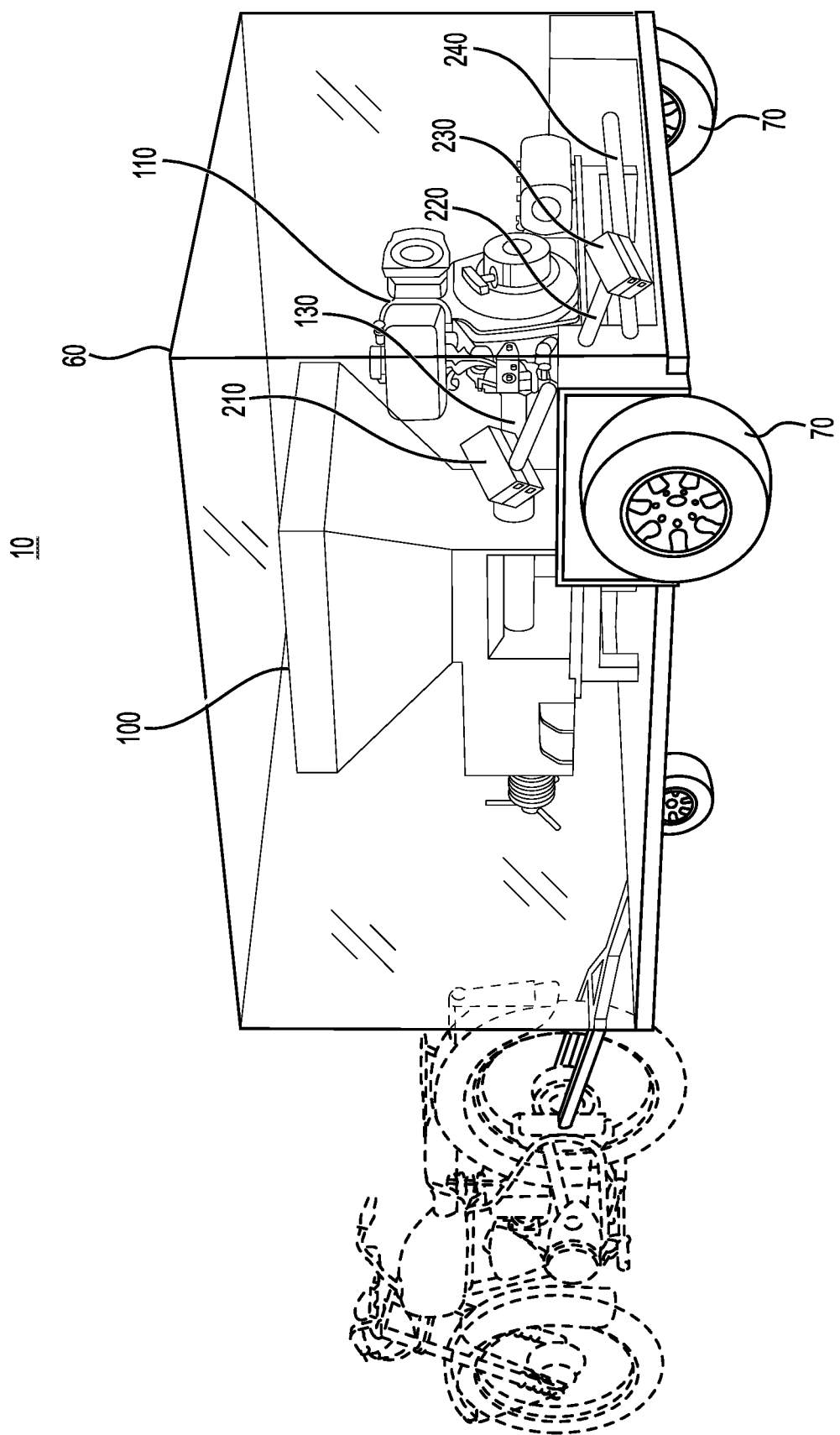
FIG. 9 is another side elevational view of the mobile palm oil processing machine showing a gear box coupling the drive shaft to an axle driving a pair of rear wheels.

FIG. 9 illustrates a side elevational view of the mobile palm oil processing machine 10 showing an aspect for self-propulsion. The removable cover 60 is shown in transparent view to illustrate the interior of the mobile palm oil processing machine 10. A transmission 210 is selectably coupled to the drive shaft 130 during times when it is desirable for the engine 110 to supply thrust to the rear wheels 70 via a second drive shaft 220 which is further coupled to an axle 240 via a differential 230. Self-propulsion provides a solution to situations when the mobile palm oil processing machine 10 is stuck, for example in mud, sand, ruts, or traveling on narrow roads or navigating around other obstructions, and would benefit from the ability of the mobile palm oil processing machine 10 to help extract itself or work in tandem with the light-duty vehicle 20 for extraction. This feature further enhances the ability of the mobile palm oil processing machine 10 to handle steep inclines, for example climbing a steep incline with additional thrust to the rear wheels 70, or for descending a steep incline when the mechanical resistance of the engine 110 and palm oil press 100 may be used to slow the descent and reduce the stress on the brakes of the light duty vehicle 20. This feature adaptively allows the use of light-duty vehicles 20 like the motorcycle for towing the palm oil processing machine 10 since the light-duty vehicle 20 typically may have limited thrust and braking ability which may be adequate only for improved roads and moderate inclines.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A mobile palm oil processing machine, comprising:
   a trailer adapted for towing behind a light-duty vehicle, the trailer comprising a deck structure, a pair of rear wheels coupled to a rear portion of the deck structure, a front wheel rotatably coupled to a front portion of the deck structure, and a towing arm coupled to the front portion of the deck structure;
   a palm oil press coupled to a top portion of the deck structure;
   an engine coupled to the top portion of the deck structure and to a rear of the palm oil press,
   a drive shaft coupling the engine to the palm oil press, and
   a removable cover for enclosing the trailer, wherein the removable cover comprises a rear cover, a top cover, a rotatable left cover, and a rotatable right cover.

2. The mobile palm oil processing machine of claim 1, wherein the left cover and the right cover are rotatably attached to the top cover.

3. The mobile palm oil processing machine of claim 2 wherein at least one of the left cover and the right cover can be raised during deployment.

4. The mobile palm oil processing machine of claim 1, wherein the left cover and the right cover are rotatably attached to the deck structure.

5. The mobile palm oil processing machine of claim 4 wherein at least one of the left cover and the right cover can be lowered during deployment.

6. The mobile palm oil processing machine of claim 1 further comprising a transmission for selectably coupling the drive shaft to at least one of the pair of rear wheels.

7. A mobile palm oil processing machine, comprising:
   a trailer adapted for towing behind a light-duty vehicle, the trailer comprising a deck structure, a pair of rear wheels coupled to a rear portion of the deck structure, a front wheel rotatably coupled to a front portion of the deck structure, and a towing arm coupled to the front portion of the deck structure;
   a palm oil press coupled to a top portion of the deck structure;
   an engine coupled to the top portion of the deck structure and to a rear of the palm oil press,
   a drive shaft coupling the engine to the palm oil press, and
   a transmission for selectably coupling the drive shaft to at least one of the pair of rear wheels, wherein the rear wheels are larger than the front wheel.

8. The mobile palm oil processing machine of claim 7, further comprising a removable cover for enclosing the trailer.

9. The mobile palm oil processing machine of claim 8, the removable cover further comprising a rear cover, a top cover, a left cover, and a right cover, wherein the left cover and the right cover are rotatably attached to the top cover.

10. The mobile palm oil processing machine of claim 9 wherein at least one of the left cover and the right cover can be raised to allow operation of the mobile palm oil processing machine during deployment.

11. The mobile palm oil processing machine of claim 8, the removable cover further comprising a rear cover, a top cover, a left cover, and a right cover, wherein the left cover and the right cover are rotatably attached to the deck structure.

12. The mobile palm oil processing machine of claim 11 wherein at least one of the left cover and the right cover may be lowered to allow operation of the mobile palm oil processing machine during deployment.

\* \* \* \* \*